United States Patent
Emery et al.

(10) Patent No.: US 7,673,503 B2
(45) Date of Patent: Mar. 9, 2010

(54) METHOD FOR ESTIMATING AN ENGINE EXHAUST TEMPERATURE AND METHOD FOR DIAGNOSING A CYLINDER PRESSURE SENSOR USING AN EXHAUST TEMPERATURE ESTIMATE

(75) Inventors: Pascal Emery, Courbevoie (FR); Vincent Talon, Bretonneux (FR)

(73) Assignee: Renault S.A.S., Boulogne-Billancourt (FR)

( * ) Notice: Subject to any disclaimer, the term of this patent is extended or adjusted under 35 U.S.C. 154(b) by 68 days.

(21) Appl. No.: 12/089,274

(22) PCT Filed: Sep. 28, 2006

(86) PCT No.: PCT/FR2006/050954

§ 371 (c)(1),
(2), (4) Date: Jun. 13, 2008

(87) PCT Pub. No.: WO2007/042693

PCT Pub. Date: Apr. 19, 2007

(65) Prior Publication Data

US 2008/0300769 A1    Dec. 4, 2008

(30) Foreign Application Priority Data

Oct. 7, 2005    (FR) .................................. 05 10259

(51) Int. Cl.
*G01L 23/00* (2006.01)

(52) U.S. Cl. ..................... 73/114.17; 73/1.68; 73/23.31; 123/435

(58) Field of Classification Search .................. 73/1.68, 73/23.31, 114.01, 114.16, 114.17; 123/435
See application file for complete search history.

(56) References Cited

U.S. PATENT DOCUMENTS

| | | | | |
|---|---|---|---|---|
| 5,303,168 A * | 4/1994 | Cullen et al. | ................ | 700/299 |
| 5,606,855 A * | 3/1997 | Tomisawa | .................... | 60/274 |
| 5,956,941 A * | 9/1999 | Cullen et al. | .................. | 60/274 |
| 6,691,507 B1 * | 2/2004 | Meyer et al. | ................... | 60/285 |
| 6,957,527 B2 * | 10/2005 | Ueda et al. | .................... | 60/274 |
| 7,316,157 B2 * | 1/2008 | Ohsaki | .................... | 73/114.69 |
| 2004/0030485 A1 | 2/2004 | Yuji | | |
| 2004/0230366 A1 * | 11/2004 | Ueda et al. | .................. | 701/108 |
| 2007/0245818 A1 * | 10/2007 | Matekunas et al. | ......... | 73/118.1 |

FOREIGN PATENT DOCUMENTS

| | | |
|---|---|---|
| DE | 10319333 | 11/2004 |
| EP | 1 431 546 | 6/2004 |
| EP | 1 528 241 | 5/2005 |

\* cited by examiner

*Primary Examiner*—Erick Solis
(74) *Attorney, Agent, or Firm*—Oblon, Spivak, McClelland, Maier & Neustadt, L.L.P.

(57) ABSTRACT

A method for estimating exhaust temperature on an output of an internal combustion engine cylinder, the cylinder including a crankshaft transforming into a rotation a translational movement of a piston mounted sliding in the cylinder, the piston closing a combustion chamber of the cylinder. The exhaust temperature is estimated based on the temperature inside the cylinder at a time of opening of the valve, the temperature inside the cylinder being itself estimated from an angle of rotation of the crankshaft, cylinder pressure, volume of air injected into the cylinder, and flow rate of recycled gases. A method diagnoses a cylinder pressure sensor based on an estimate of the exhaust temperature.

5 Claims, 1 Drawing Sheet

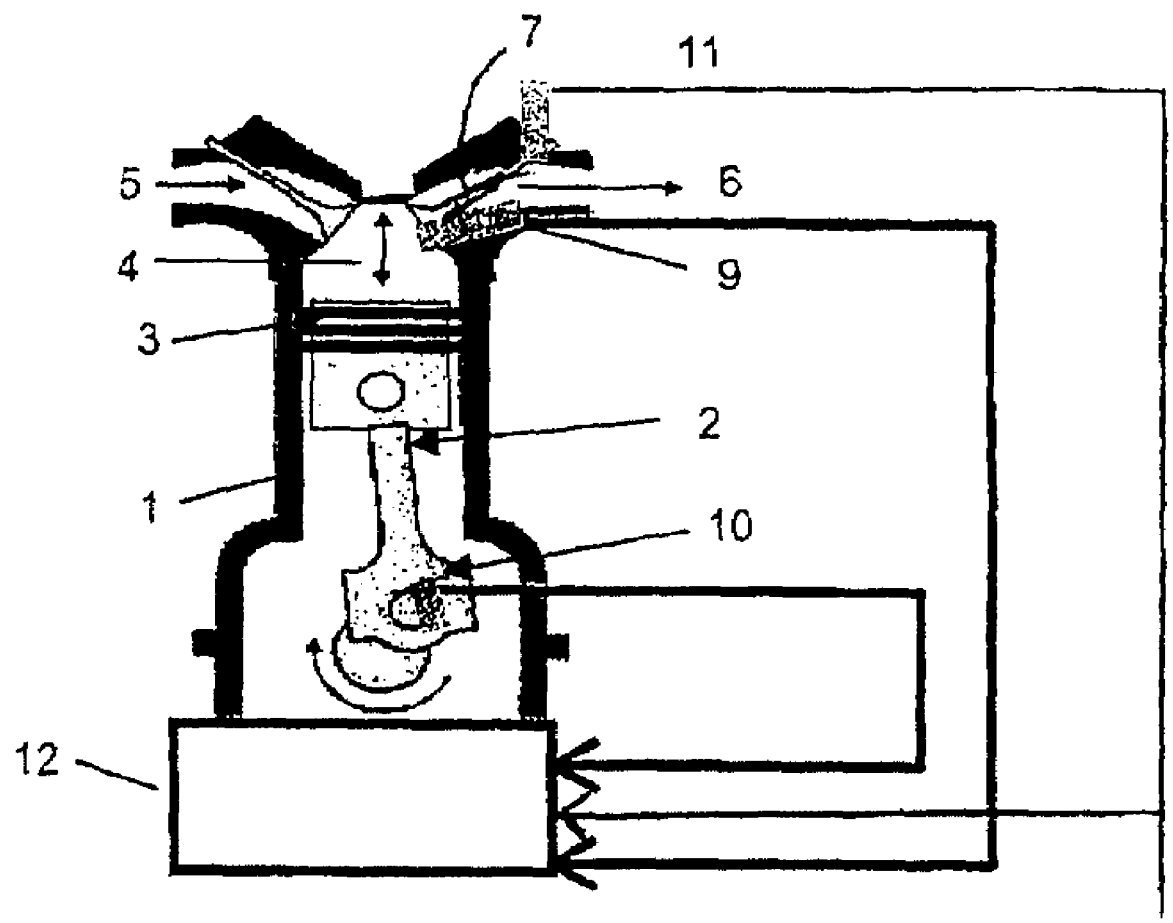
Single figure

METHOD FOR ESTIMATING AN ENGINE EXHAUST TEMPERATURE AND METHOD FOR DIAGNOSING A CYLINDER PRESSURE SENSOR USING AN EXHAUST TEMPERATURE ESTIMATE

The invention relates to a method for estimating the exhaust temperature at an outlet of a cylinder of an internal combustion engine, the said outlet being closed by an exhaust valve which can open to let out gases present inside the cylinder, and the said cylinder comprising a crankshaft converting to rotation a translational movement of a piston mounted such that it can slide in the cylinder, the said piston closing a combustion chamber of the cylinder. The invention also relates to a method for testing a cylinder pressure sensor.

The invention finds a particularly advantageous application in the field of rotary internal combustion engines (gasoline or diesel), with direct or indirect fuel injection, and comprising a bank of cylinders.

European antipollution regulations for automobile engines are becoming more and more stringent. It is therefore important for automobile manufacturers to reduce the polluting emissions of their engines, without sacrificing however the fuel consumption and the performance of the engines. Consequently, exhaust emission-control systems are getting larger, more and more sophisticated and more and more expensive.

For certain known emission-control systems and the programs for optimizing engine performance, one of the most important parameters is the temperature at the exhaust of the engine, also called the "pre-turbine temperature." The temperature at the exhaust can be used for example to employ programs for managing a particulate filter or an NOx trap. The temperature at the exhaust is also used to protect a turbocharger of the engine from destruction, by regulating the operation of the turbocharger so as to limit the exhaust temperature. It is also used to maintain a given level of engine performance, or to correct the variations in performance from one engine to another, by acting on the flow rate of fuel injected into the combustion chamber of the engine.

Currently, the temperature at the exhaust is measured by a temperature sensor, installed between the engine and the exhaust pipe, or between the engine and the turbocharger, if there is one. The presence of this sensor increases the cost of an emission-control system.

Another important parameter is the cylinder pressure, inside the cylinder of the engine, in particular at the moment of the opening of the exhaust valve letting the burned gases escape in the direction of the exhaust pipe. The cylinder pressure is one of the parameters which best characterizes the combustion phase during the thermodynamic cycle of the engine. Controlling the combustion phase makes it possible to limit the pollution at the source, that is to say at the outlet of the cylinder, and therefore to limit the aging of the emission-control system.

Only recently have sensors for measuring this cylinder pressure been mass-produced. However, the reliability of these sensors is not currently guaranteed, and these sensors are too new for useful experimental feedback to be obtained. If the sensor breaks down, the injection of fuel is no longer managed correctly, which leads to a risk of engine damage; also, the pollution at the outlet of the engine is no longer under control, which leads to a premature aging of the antipollution system.

A main object of the invention is to reduce the cost of removing pollutants from the exhaust gases of an internal combustion engine, during the whole life of the engine.

To do that, the invention provides firstly a method for estimating the exhaust temperature. Thus, it is no longer necessary to have a sensor to know the exhaust temperature. Other sensors can also be eliminated, in particular the manifold pressure sensor. The cost of the emission-control system is reduced accordingly.

The inventive method for estimating the exhaust temperature, which is moreover in accordance with the preamble above, is characterized in that it comprises the following steps, consisting in:

S1: measuring, at a time preceding a time of opening of the exhaust valve, an angle of rotation of the crankshaft and a cylinder pressure inside the combustion chamber, and determining a volume of the combustion chamber according to the angle of rotation;

S2: determining a mass of air and a proportion of recycled gases in the combustion chamber at the time of opening, and deducing from this a related total mass of gas;

S3: determining a cylinder temperature inside the cylinder according to the cylinder pressure, the volume of the combustion chamber and the total mass of gas at the time of the opening of the exhaust valve;

S4: determining the exhaust temperature according to the cylinder temperature.

The exhaust temperature is thus estimated from the temperature inside the cylinder, itself estimated from the cylinder pressure, the angle of rotation of the crankshaft at a time close to the opening of the exhaust valve, the mass of air injected into the cylinder and the proportion of recycled gases.

Preferably, the exhaust temperature is calculated from the temperature inside the cylinder according to a linear equation of the type Teh=$A.T_{BBDC}$+B. Surprisingly, experiments show that the linear model, although very simple, is a good representation of the relationship between the exhaust temperature and the temperature inside the cylinder.

The invention also provides a method for testing a cylinder pressure sensor, which uses an estimate of the exhaust temperature and a measurement of the exhaust temperature. Thus, the combustion phase of the engine can be regulated, the pollution at the outlet of the engine can be brought under control, the life of an antipollution system is thus prolonged, and engine damage is prevented.

The method for testing the cylinder pressure sensor is essentially characterized by the following steps, consisting in:

measuring a cylinder pressure at a time preceding an opening of an exhaust valve of the said cylinder;

estimating an exhaust temperature from the measured cylinder pressure, employing a method as claimed in one of the preceding claims;

measuring an exhaust temperature at the outlet of the cylinder;

comparing the estimated exhaust temperature and the measured exhaust temperature, and deducing from this a normal operation or a defective condition of the cylinder pressure sensor.

The invention will be better understood and other features and advantages will emerge on reading the description which follows of an embodiment of a discharge circuit and a power outlet stage according to the invention. The description should be read with reference to the attached drawing in which the single FIGURE is a system which can be used to employ methods according to the invention.

Illustrated in the single FIGURE is a system which can be used to employ methods according to the invention.

The system comprises a cylinder 1 of an internal combustion engine. Inside the cylinder, a crankshaft 2 converts to rotation a translational movement of the piston 3 mounted such that it can slide and closing a lower portion of a combustion chamber 4 formed inside the cylinder 1. The cylinder 1 also comprises an intake area 5 to allow the entry of the gases into the combustion chamber 4 and an outlet 6 closed by a valve 7 which can open to let the burned gases (or exhaust gases) escape.

The system also comprises a cylinder pressure sensor 9 for measuring the pressure of the gases inside the cylinder and an angle sensor 10 for measuring an angle of rotation of the crankshaft.

If the system is used to employ the method for testing the cylinder pressure sensor, the system also comprises a temperature sensor 11 for measuring the temperature of the exhaust gases at the outlet of the cylinder. This sensor is not needed if the system is used only for estimating the temperature of the exhaust gases.

Finally the system comprises a management system 12 for receiving a signal from the sensors 9, 10, and if necessary from the sensor 11, and deducing from this, according to the method employed, a temperature of the exhaust gases at the outlet of the cylinder or a normal or defective condition of the cylinder pressure sensor.

The system in the single FIGURE makes it possible to employ the inventive method for estimating the temperature of the exhaust gases comprising the following steps, consisting in:

S1: measuring, at a time preceding a time of opening $t_{BBDC}$ of the exhaust valve, the angle of rotation $\theta_{BBDC}$ of the crankshaft and the cylinder pressure $P_{BBDC}$ inside the combustion chamber, and determining a volume $V_{BBDC}$ of the combustion chamber according to the angle of rotation $\theta_{BBDC}$;

S2: determining a mass of air Mair and a proportion of recycled gases TEGR in the combustion chamber at the time of opening $t_{BBDC}$, and deducing from this a related total mass Mtot of gas;

S3: determining a cylinder temperature $T_{BBDC}$ inside the cylinder according to the cylinder pressure $P_{BBDC}$, the volume $V_{BBDC}$ of the combustion chamber and the total mass of gas Mtot at the time of the opening of the exhaust valve;

S4: determining the exhaust temperature Texh according to the cylinder temperature $T_{BBDC}$.

The method for estimating the exhaust temperature thus enables the temperature of the exhaust gases to be estimated easily according to the cylinder pressure.

First of all the pressure $P_{BBDC}$ inside the cylinder and the angle of rotation $\theta_{BBDC}$ of the crankshaft are measured by the sensors 9, 10, just before the opening of the exhaust valve.

The angle of rotation $\theta_{BBDC}$ of the crankshaft makes it possible to determine the height of the piston then the volume $V_{BBDC}$ of the combustion chamber at the opening of the exhaust valve. This can be done either from a table, showing for each angle value a related volume, or otherwise from a mathematical model.

Next the mass of air Mair and the proportion of recycled gases TEGR entering the cylinder just before the opening of the valve are estimated. This can be done from a table or a mathematical model, according to the angle of rotation of the crankshaft and the engine parameters. It is also possible to measure the mass of air Mair and the proportion of recycled gases TEGR, from suitable sensors located in the intake area.

The mass of air and the proportion of recycled gases make it possible to determine the total mass of gas inside the cylinder at the time of the opening of the valve: Mtot=Mair/(1−TEGR) (the mass of fuel injected into the cylinder at the time of the opening of the valve is ignored here).

Next the temperature inside the cylinder is deduced from this, assuming the gases are ideal:

$$T_{BBDC} = P_{BBDC} \times V_{BBDC}/(r \times M\text{tot}),$$

where r is a constant, dependent in particular on the ideal gas constant and the relative molecular mass of the gases inside the cylinder.

Experiments have shown that it is possible to estimate the exhaust temperature from the temperature inside the cylinder at the opening of the valve by the following linear equation: Texh=A.$T_{BBDC}$+B. A and B are two constants, linked in particular to the physical characteristics of the cylinder. A and B can be determined experimentally, for example during an initialization step of the method.

The system in the single FIGURE also makes it possible to employ a method according to the invention for testing the cylinder pressure sensor 9.

To do that, simply add to the system in the FIGURE a temperature sensor, fitted to the outlet 6 of the cylinder.

The method for testing according to the invention comprises the following steps, consisting in:

measuring a cylinder pressure at a time preceding an opening of an exhaust valve of the said cylinder;

estimating an exhaust temperature from the measured cylinder pressure, employing a method as claimed in one of the preceding claims;

measuring an exhaust temperature at the outlet of the cylinder;

comparing the estimated exhaust temperature and the measured exhaust temperature, and deducing from this a normal operation or a defective condition of the cylinder pressure sensor, according to whether the difference between the estimated temperature and the measured temperature is less than or more than a preset value.

It will be easily understood that the reliability of the testing of the pressure sensor is highly dependent on the reliability of the temperature sensor. However, since the pressure sensor works in a hostile environment (high temperature and high pressure inside the cylinder), the probability of the pressure sensor being defective is much greater than the probability of the temperature sensor being defective. What is more, the exhaust gas temperature sensor can be tested by other means, known and used elsewhere. Which is not the case for the cylinder pressure sensor.

The invention claimed is:

1. A method for estimating exhaust temperature at an outlet of a cylinder of an internal combustion engine, the outlet being closed by an exhaust valve that can open to let out gases present inside the cylinder, and the cylinder including a crankshaft converting to rotation a translational movement of a piston mounted such that the piston can slide in the cylinder, the piston closing a combustion chamber of the cylinder, the method comprising:

measuring, at a time preceding a time of opening of the exhaust valve, an angle of rotation of the crankshaft and a cylinder pressure inside the combustion chamber, and determining a volume of the combustion chamber according to the angle of rotation;

determining a mass of air and a proportion of recycled gases in the combustion chamber at the time of opening, and deducing from the determining a related total mass of gas;

determining a cylinder temperature inside the cylinder according to the cylinder pressure, the volume of the combustion chamber, and the total mass of gas at the time of the opening of the exhaust valve; and determining the exhaust temperature according to the cylinder temperature.

2. The method as claimed in claim 1, in which, during the determining the exhaust temperature according to the cylinder temperature, a linear equation (Texh=A·$T_{BBDC}$+B) is used, in which Texh is exhaust temperature and $T_{BBDC}$ is a time of opening of the exhaust valve.

3. The method as claimed in claim 1, in which, during the determining the cylinder temperature, the mass of air and/or proportion of recycled gases are/is estimated according to the angle of rotation of the crankshaft from a table or from a mathematical model, or are/is measured.

4. The method as claimed in claim 1, in which, during the determining the mass of air, the total mass of gas is obtained from equation:

$$M\text{tot}=M\text{air}/(1-TEGR),$$

in which Mtot is the total mass of gas, Mair is the mass of air, and TEGR is the proportion of recycled gases.

5. A method for testing a cylinder pressure sensor located inside a cylinder of an internal combustion engine, the cylinder including an outlet closed by an exhaust valve that can open to let out gases present inside the cylinder, the method comprising:

measuring a cylinder pressure at a time preceding an opening of an exhaust valve of the cylinder;

estimating an exhaust temperature from the measured cylinder pressure, employing a method as claimed in claim 1;

measuring an exhaust temperature at the outlet of the cylinder; and comparing the estimated exhaust temperature and the measured exhaust temperature, and deducing from the comparison a normal operation or a defective condition of the cylinder pressure sensor.

* * * * *